G. CALVERT.
Bee Hive.
No. 10,196.
Patented Nov. 1, 1853.
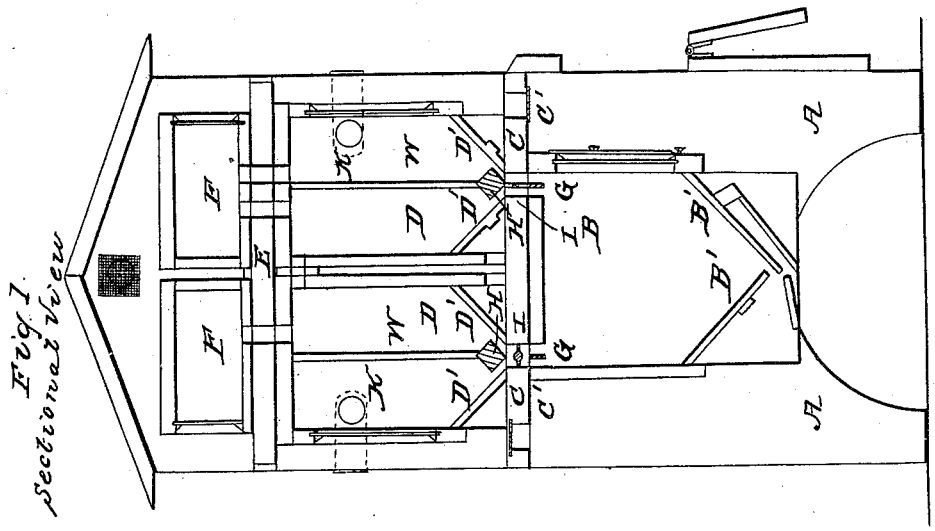
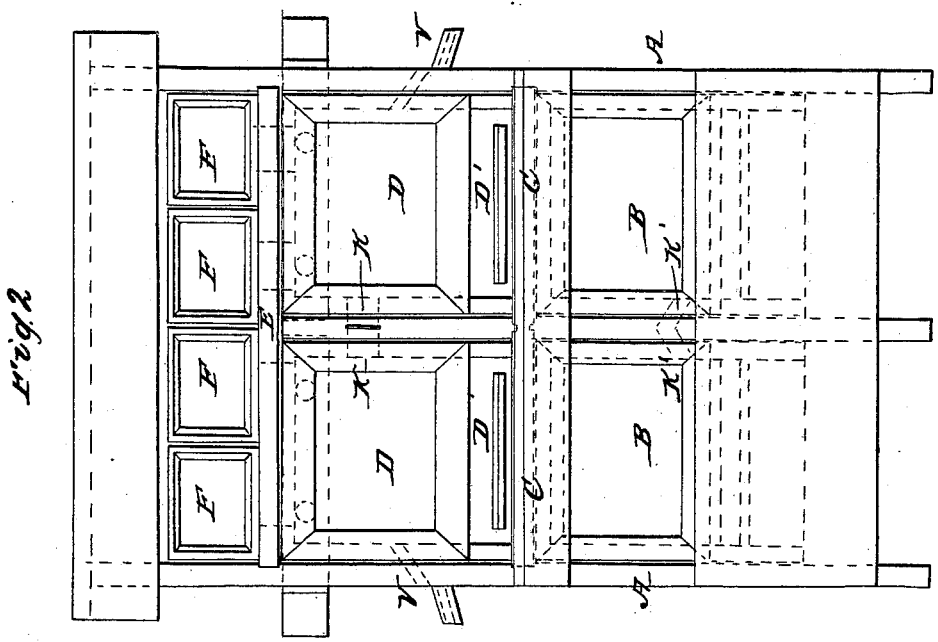

UNITED STATES PATENT OFFICE.

GEORGE CALVERT, OF UPPERVILLE, VIRGINIA.

BEEHIVE.

Specification of Letters Patent No. 10,196, dated November 1, 1853.

*To all whom it may concern:*

Be it known that I, GEORGE CALVERT, of Upperville, in the county of Fauquier and State of Virginia, have invented certain new and useful Improvements in Beehives; and I do hereby declare that the following is a full, clear, and exact description of the same, reference being had to the annexed drawing of the same, making part of this specification, in which—

Figure 1, is a vertical transverse section of the hive. Fig. 2 is a front elevation of the hive.

Similar letters indicate the same part.

My invention may be termed an apiarian improvement, embracing, first, the stand or bench A, the manner of sheltering or protecting the first tier of hives B, (termed brood hives) from the sun, by means of the extension of the first floor C, on each side at C′, which floor becomes the base or bench for adding or connecting immediately above each brood hive B, two full size store hives D, for honey, which also may become brood hives should the wants of the colony require it, and on the second floor E, two cap hives F, over each store hive D. Secondly, the particular manner of constructing and connecting the brood and store hives, the advantages of which are as follows: By means of the hopper formed bottom B′, to the brood hives, as described, the litter is all freely and certainly passed off, and said bottom is as nearly as possible conformed to the position in which the bees naturally work their comb, breed their young, and congregate themselves together in winter, so that there is rendered thereby less unoccupied space for the cold air in winter, thereby securing more certainly the health of the colony through the winter. Thirdly, by means of the double inclined plane D′, in the store hives D, connected with the double flue G, immediately at the inside of the top of the brood hives B, is effected perfect cleaning, passing the litter thus down the sides rather than through the middle or center of the brood hives B, so that passing the litter off does not disturb the brood colony at work, and the cross piece H, brought down to the mouth of the double inclined plane D, becomes a base for the support of the comb, and at the same time prevents the bees from working their comb down through or into the double flues G, so that the store hives D, may be readily removed without breaking the comb and taken any distance to market in the hive with care, and in that way the best price can be obtained for the honey. Each cross piece is connected with the top of the hive by the upright W, which is intended to facilitate the operation of the bees in the construction of the first sheets of comb and lead them to commence at the top instead of on the cross piece H, as they sometimes have done. By means of the double flue G, more space is gained in the store hives for honey and by placing the cross-stick H, at the bottom the sheets of honey comb are made regular and much easier removed than when the cross-stick is introduced through the middle or center of the hives. The irregular formation of the combs occasioned by a center cross-stick often enables the moth worm to make a successful lodgment in a hive, and thereby ruin it entirely. And lastly by the use of the movable division or valves I, (in the drawing one of these valves is shown closed the other open) forming the double flue in the first floor C, the communications between the brood and store hives are readily closed when you wish to remove the store hives D, or to cause the brood hive B, in the spring to throw off one or more swarms of bees to extend your apiary. A sheet of tin passed horizontally over the flues G, of the brood hives and under the floor may be used to produce the same effect. The hive is thus rendered a swarming or nonswarming hive at pleasure, the advantages of which are clear to all apiarians. Giving the bees the use of the store hives after one or two swarms have come out from the brood hives will prevent late swarms leaving, which could not make a support and would greatly weaken the brood hive or mother colony, and again, wishing to extend or increase the apiary, should there be two brood colonies of bees in the palace, one in each of the brood hives, and not likely to throw off a swarm, by removing one of the brood hives, with the colony of bees in it, and placing it in a new palace and returning an empty brood-hive to the place rendered vacant, and opening passages K′, seen in Fig. 2 connecting the brood hives longitudinally, the bees would work through into the empty brood hive in time, and thus give you entire control over your bees and power to direct their operations.

The inclined floors used in this hive prevent the harboring of the moth worm and the retention of litter and render the expulsion of intruders far easier than from floors of horizontal surfaces. By this means the colony is kept in a flourishing and healthy condition and enabled to increase their store of honey to a considerable extent beyond what would be obtained by flat bottomed hives.

The inclined plane flue V, in the ends of the palace and store hives are to be used only while the bees are filling the store hives and the smaller caps above them, thus facilitating their labors by a more direct egress and ingress.

What I claim as my invention and desire to secure by Letters Patent, is—

The combination of the honey boxes D D, with the box B and cross pieces H H, arranged and operated in the manner, and for the purposes set forth.

In testimony whereof, I have hereunto signed my name before two subscribing witnesses.

GEORGE CALVERT.

Witnesses:
GEORGE PATTEN,
F. OBEZ.